United States Patent Office 3,290,353
Patented Dec. 6, 1966

3,290,353
HALOGENATED AROMATIC NITRILES
Robert D. Battershell, Painesville, and Henry Bluestone, University Heights, Ohio, assignors to Diamond Alkali Company, Cleveland, Ohio, a corporation of Delaware
No Drawing. Filed Apr. 1, 1963, Ser. No. 269,751
14 Claims. (Cl. 260—465)

This application is a continuation-in-part of application Serial No. 140,261, filed September 25, 1961, now abandoned.

This invention relates to novel halogenated aromatic nitriles and, more particularly, relates to ring halogenated benzonitriles, terephthalonitriles, and isophthalonitriles.

The term "halogenated aromatic nitriles" as employed in the specification and claims refers to mono- and di-cyano substituted benzenes having at least one halogen atom attached to a ring carbon atom. The halogenated benzonitriles of this invention have the general formula:

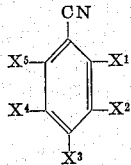

wherein $X^1$, $X^2$, $X^4$ and $X^5$ are hydrogen or halogen, preferably chlorine, fluorine and bromine with at least 1 and not more than 3 of these X's being halogen; and $X^3$ is hydrogen, fluorine or bromine. Typical benzonitriles of this invention are 2-chloro-6-fluorobenzonitrile, 2,6-difluorobenzonitrile and 3,5-dichloro-2,6-difluorobenzonitrile.

The di-cyano substituted halogenated benzenes of this invention have the general formula:

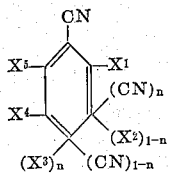

wherein $X^1$, $X^2$, $X^3$, $X^4$ and $X^5$ are hydrogen or halogen, preferably chlorine, fluorine and bromine, with at least one X being halogen and $n$ is an integer from 0 to 1, inclusive. Typical di-cyano benzene derivatives of this invention are tetrachloroterephthalonitrile, tetrafluoroterephthalonitrile, tetrachloroisophthalonitrile, difluorodichloroterephthalonitrile and 5-chloro-2,4,6-trifluoroisophthalonitrile.

The novel halogenated aromatic nitriles of this invention may be prepared from the corresponding ring-chlorinated acid chlorides. The acid chloride is converted to the corresponding amide by dissolving the acid chloride in a suitable organic solvent and introducing ammonia. A wide range of solvents may be employed in this reaction with the presently preferred solvents being xylene or dioxane. Either anhydrous or aqueous ammonia may be employed, depending upon whether the solvent used is miscible with water.

The reaction between the acid chloride and ammonia is exothermic and the reactor may be cooled to maintain a maximum temperature of about 40° to 60° C. The aromatic amide which is formed is insoluble in most organic solvents and this material precipitates from the solution. Ammonium chloride is formed as a by-product and is separated from the desired amide. If a water miscible solvent such as dioxane is used, and aqueous ammonia is employed as the source of ammonia, sufficient water may be added to the reaction mixture to dissolve the ammonium chloride, and the solid precipitate is primarily the desired halogenated aromatic amide. If a solvent such as xylene, which is not miscible with water, is used or if anhydrous ammonia is employed, the precipitate comprising the amide and the ammonium chloride is filtered and then washed with water to remove the ammonium chloride and again filtered to recover the desired amide.

The ring-chlorinated aromatic amide is dried to remove all traces of water and is reacted with a dehydrating agent such as phosphorus pentoxide or phosphorus oxychloride with the presently preferred dehydrating agent being phosphorus oxychloride. The reaction time and temperature will be governed by the reactivity of the dehydrating agent employed. Typical conditions when phosphorus oxychloride is used are a temperature of about 75° to 110° C. and a reaction time of about 1 to 6 hours. The product of the dehydration reaction is an aromatic nitrile, having chlorine atoms occupying the same positions on the aromatic ring as they did in the acid chloride starting material.

The fluorinated compound may be prepared by a halogen interchange reaction whereby chlorine is replaced by fluorine. Chlorine atoms which are in position, either ortho or para to a cyano group, are activated by the cyano group and, accordingly, are readily removed or replaced by fluorine atoms. The preferred reactant is an alkali metal fluoride wherein the alkali metal is below sodium in the Periodic Table, e.g., potassium fluoride, rubidium fluoride, cesium fluoride, etc., or cuprous fluoride, with the presently preferred material being potassium fluoride. In order to prepare tetrafluoroterephthalonitrile an excess of the metal fluoride is employed; for example, tetrachloroterephthalonitrile is treated with 4 to 10, typically about 5, molar equivalents of potassium fluoride. The reaction preferably is carried out in a solvent such as dimethyl formamide, N-methyl-2-pyrolidinone, dimethyl sulfoxide, dimethyl sulfone, tetramethylene sulfone or the like, at a temperature range of about 80° to 200° C. and for periods of ½ to 24 hours, commonly 2 to 4 hours.

The tetrahalophthalonitriles may also be prepared by reacting potassium or cuprous cyanide and hexahalobenzene in a molar ratio of approximately 2:1.

The halogenated aromatic dinitriles of this invention exhibit outstanding biological activity as fungicides, bactericides and nematocides. The halogenated benzonitriles possess significant selective herbicidal properties.

While it is possible to apply the compounds of the present invention in undiluted form to the plant or other material to be protected, it is frequently desirable to apply the novel tetrahaloterephthalonitrile in admixture with either solid or liquid inert, pesticidal adjuvants. Thus, the aromatic nitriles can be applied to the plants for fungicidal purposes, for example, by spraying the plants with aqueous or organic solvent dispersions of the tetrahaloterephthalonitriles. The choice of an appropriate solvent is determined largely by the concentration of active ingredient which it is desired to employ, by the volatility required in a solvent, the cost of the solvent and the nature of the material being treated. Among the many suitable solvents which can be employed as carriers for the present pesticides, there may be mentioned hydrocarbons such as benzene, toluene, xylene, kerosene, diesel oil, fuel oil, petroleum, naphtha; ketones such as acetone, methyl ethyl ketone and cyclohexanone; chlorinated hydrocarbons, such as carbon tetrachloride, chloroform, trichloroethylene, perchlorethylene; esters such as ethyl acetate, amyl acetate and butyl acetate; the monoalkyl ethers of ethylene glycol, e.g., the monomethyl ethers; and the monoalkyl ethers of diethylene glycol, e.g., the monoethyl ether; alcohols such as ethanol, isopropanol and amyl alcohol, etc.

The aromatic nitriles can also be applied to plants and other materials along with inert solid fungicidal adjuvants or carriers such as talc, pyrophyllite, Attaclay, kieselguhr, chalk, diatomaceous earth, calcium carbonate, bentonite, fuller's earth, cottonseed hulls, wheat flour, soybean flour, etc., pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters; addition products of long-chain mercaptans and ethylene oxide; sodium alkyl benzene sulfonates having 14 to 18 carbon atoms, alkylphenolethylene oxides, e.g., p-isooctyl phenol condensed with 1 ethylene oxide units; and soaps, e.g., sodium stearate and sodium oleate. A typical surface active agent is Aerosol OS (sodium salt of propylated naphthalenesulfonic acid).

The solid and liquid formulations can be prepared by any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the solid carrier in finely divided form in amounts small enough to preserve the free-flowing property of the final dust compositions.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 to 50 percent of the total by weight. However, concentrations outside this range are operative and compositions containing from 1 to 99 percent of active ingredient by weight are contemplated, the remainder being carrier and/or any other additive or adjuvant material which may be desired. It is often advantageous to add small percentages of surface active agents, e.g., 0.5 to 1 percent of the total composition by weight, to dust formulations, such as the surface active agents previously set forth.

For spray application, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0 percent of a surface active agent, by weight, is included in the liquid composition.

For adjuvant purposes, any desired quantity of surface active agent may be employed, such as up to 250-percent of the active ingredient by weight. If the surface active agent is used only to impart wetting qualities, for example, to the spray solution, as little as 0.05 percent, or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30 percent, by weight, of the total and may be 10 percent, or even as low as 0.01 percent.

The novel aromatic nitriles of the present invention can be employed in compositions containing other pesticides, more especially, fungicides, insecticides and bactericides.

In order that those skilled in the art may more completely understand the present invention and the preferred methods by which the same may be carried into effect, the following specific examples may be offered.

EXAMPLE 1

*Preparation of tetrachloroisophthaloyl chloride*

In a 2-liter Morton (creased) flask are placed 276 g. (1.0 mole) of 2,4,5,6-tetrachloro-m-xylylene diol and 1 liter of iron-free carbon tetrachloride. The slurry is heated and irradiated with two 250-watt heat lamps and one 100-watt mercury vapor lamp. Into the well-stirred irradiated refluxing mixture is bubbled 775 g. (10.6 moles) of chlorine gas over an 18-hour period. The amount of carbon tetrachloride employed is sufficient to dissolve the acid chloride product so that the disappearance of the nearly insoluble diol can be used as a convenient end point for the chlorination. Air is drawn through the hot mixture to remove the dissolved chlorine and hydrochloric acid, after which the solution is evaporated to dryness, leaving the white crystalline tetrachloroisophthaloyl chloride. After one recrystallization from heptane, the product weighs 291 g. (86% yield) and has a melting point of 99° to 102° C. A sample which is further purified by being washed with methanol and recrystallized from heptane, has a melting point of 100° to 101° C. and the following elemental analysis:

| Element | Percent Calculated | Percent Actual |
|---|---|---|
| Carbon | 28.1 | 28.2 |
| Hydrogen | 0.0 | 0.2 |

By the procedure of this example, other ring-chlorinated acid chlorides are prepared for m- and p-xylylene diols having chlorine atoms on appropriate carbon atoms of the benzene ring.

EXAMPLE 2

*Preparation of tetrachloroterephthalamide*

In a 1-liter Morton flask are placed 170 g. (0.5 mole) of tetrachloroterephthaloyl chloride and 500 ml. of dioxane. To this stirred mixture is added, dropwise, 200 ml. (3.0 moles) of 28-percent ammonium hydroxide. The reaction is exothermic and, when the reaction temperature reaches about 50° C., the flask is cooled by means of a water bath and the temperature maintained at about 40° to 50° C. throughout the remainder of the addition period. The resulting heavy slurry is stirred for 2 hours. The mixture is diluted with an equal volume of cold water, the precipitate collected, washed with water and dried in an oven at 110° to 115° C. The dry white amorphous powder weighs 155 g. (quantitative yield). A portion of the product after recrystallization from methanol has a melting point above 430° C. and the assigned formula $C_8H_4Cl_4N_2O_2$, is confirmed by the following elemental analysis:

| Element | Percent Calculated | Percent Actual |
|---|---|---|
| Carbon | 31.8 | 32.0 |
| Hydrogen | 1.3 | 1.5 |

Following the procedure of this example, the amides of Table I are prepared.

TABLE I

| Amide | Acid Chloride | Melting Point of Amide, °C. | Elemental Analysis | | | |
|---|---|---|---|---|---|---|
| | | | Percent Calculated | | Percent Actual | |
| | | | C | H | C | H |
| Tetrachloroisophthalamide | Tetrachloroisophthaloyl chloride | 398–400 | 31.8 | 1.3 | 31.8 | 1.2 |
| 2,3,5,6-tetrachloro benzamide | Tetrachlorobenzoyl chloride | 207–208 | 32.5 | 1.2 | 32.6 | 1.2 |

EXAMPLE 3

*Preparation of 4,6-dichloroisophthalamide*

Into a 2-liter Morton flask are placed 120 g. (0.44 mole) of 4,6-dichloroisophthaloyl chloride and 1 liter of dioxane. Into this stirred solution is bubbled 75 g. (4.4 moles) of anhydrous ammonia over a period of about 2½ hours causing the reaction temperature to increase from 20° to 40° C. The mixture is heated to 60° C. with continued stirring and is then allowed to cool slowly to about 30° C. The reaction mass is suction filtered and the clear light precipitate transferred to a beaker and washed with 2 liters of cold water to dissolve out the ammonium chloride by-product. The resulting aqueous mixture is suction filtered and the precipitate is air dried to produce 78 g. (76% yield) of 4,6-dichloroisophthalamide, $C_8H_6Cl_2N_2O_2$, having a melting point of 276° to 279° C. The assigned structure is confirmed by the following elemental analysis:

| Element | Percent Calculated | Percent Actual |
|---|---|---|
| Carbon | 41.2 | 40.8 |
| Hydrogen | 2.6 | 2.5 |

Following the procedure of this example, the amides of Table II are prepared.

TABLE II

| Amide | Acid Chloride | Melting Point of Amide, °C. | Elemental Analysis | | | |
|---|---|---|---|---|---|---|
| | | | Percent Calculated | | Percent Actual | |
| | | | C | H | C | H |
| Chloroterephthalamide | Chloroterephthaloyl chloride | 266–268 | 48.4 | 3.6 | 48.0 | 3.4 |
| 2,5-dichloroterephthalamide | 2,5-dichloroterephthaloyl chloride | >300 | 41.2 | 2.6 | 41.2 | 2.6 |
| 2,3-dichloroterephthalamide | 2,3-dichloroterephthaloyl chloride | 297–299 | 41.2 | 2.6 | 41.1 | 2.4 |

EXAMPLE 4

*Preparation of tetrachloroterephthalonitrile*

Into a 300-ml. flask are placed 30 g. (0.1 mole) of tetrachloroterephthalamide and 62 g. (0.4 mole) of phosphorus oxychloride. The mixture is heated with rapid stirring at 75° to 110° C. for 3 hours, during which time there occurs a brisk evolution of HCl. The mixture is allowed to cool, then poured over crushed ice. The tan percipitate is filtered off, air-dried, washed three times with ether and finally dried in an oven at 110° C. The yield of tetrachloroterephthalonitrile, $C_8Cl_4N_2$, melting point 302° to 304° C., is 25 g. (94% yield). A sample, after recrystallization from benzene, melts at 303° to 304.5° C. and analyzes as follows:

| Element | Percent Calculated | Percent Actual |
|---|---|---|
| Carbon | 36.1 | 36.3 |
| Hydrogen | 0.1 | 0.3 |
| Nitrogen | 10.5 | 10.8 |

The ring-chlorinated nitriles of Table III are prepared by reacting phosphorus oxychloride with the respective amide shown in the table in accordance with the above process.

TABLE III

| Nitrile | Amide | Melting Point of Nitrile, °C. | Elemental Analysis | | | |
|---|---|---|---|---|---|---|
| | | | Percent Calculated | | Percent Actual | |
| | | | C | H | C | H |
| Chloroterephthalonitrile | Chloroterephthalamide | 151.5–153.5 | 59.1 | 1.9 | 58.7 | 1.7 |
| 2,3-dichloroterephthalonitrile | 2,3-dichloroterephthalamide | 179–181 | 48.8 | 1.0 | 49.0 | 1.0 |
| 2,5-dichloroterephthalonitrile | 2,5-dichloroterephthalamide | 214–215 | 48.8 | 1.0 | 49.0 | 1.1 |
| 4,6-dichloroisophthalonitrile | 4,6-dichloroisophthalamide | 185.5–186 | 48.8 | 1.0 | 48.8 | 1.0 |
| Tetrachloroisophthalonitrile | Tetrachloroisophthalamide | 250–251 | 36.1 | 0.0 | 36.2 | 0.2 |
| 2,3,5,6-tetrachlorobenzonitrile | 2,3,5,6-tetrachlorobenzamide | 146–147 | 34.8 | 0.4 | 35.1 | 0.5 |

EXAMPLE 5

*Conversion of tetrachloroterephthalonitrile to tetrafluoroterephthalonitrile*

Into a 500-ml. flask are placed 78 g. (1.35 moles) of dry potassium fluoride and 250 ml. of dimethyl formamide. This mixture is heated with stirring to 130° C., then 73 g. (0.27 mole) of tetrachloroterephthalonitrile is added in one portion. Heating and stirring are continued for 3 hours at 130° to 145° C., after which the reaction mixture is cooled quickly to room temperature and filtered. The filtrate is evaporated to dryness under vacuum and the residue extracted with hot benzene. The cool, caramel-colored benzene extract is passed through a column packed with silica-gel giving a light yellow eluent from which 23.8 g. (44% yield) of tetrafluoroterephthalonitrile, $C_8F_4N_2$, melting point 193° to 195° C., is obtained, which analyzes as follows:

| Element | Percent Calculated | Percent Actual |
|---|---|---|
| Carbon | 48.0 | 48.1 |
| Hydrogen | 0.0 | 0.3 |
| Nitrogen | 14.0 | 14.2 |

EXAMPLE 6

*Conversion of chlorine-containing aromatic nitriles to the corresponding fluorine-containing or chlorine-fluorine containing nitriles*

By following the general procedure of Example 5, but by employing less than the theoretical amount of potassium fluoride required for replacement of all chlorine atoms which are ortho or para to a cyano group, or by interrupting the reaction before it reaches completion, a mixture of chlorofluoronitriles is obtained. Starting with tetrachloroterephthalonitrile, for example, a mixture of dichlorodifluoroterephthalonitrile and chlorotrifluoroterephthalonitrile is obtained and the components are separated by fractional distillation. Specific reaction conditions and the products obtained are set forth in Table IV.

| Compound | Concentration, lbs./acre | Percent Control |
|---|---|---|
| Chlorotrifluoroterephthalonitrile | 64 | 100 |
| Dichlorodifluoroterephthalonitrile | 64 | 100 |
| 5-chloro-2,4,6-trifluoroisophthalonitrile | 64 | 100 |

EXAMPLE 8

*Spore inhibition test on glass slides*

Inhibition of spore germination on glass slides by the test tube dilution method is adopted from the procedure recommended by the American Phytopathological Society's Committee on Standardization of Fungicidal Tests. In this screen, chemicals at 1000, 100, 10 and 1.0 p.p.m. are tested for ability to inhibit germination of spores from 7- to 10-day old cultures of *Alternaria oleracea* Mil. and *Monilinia fructicola* (Wint.) Honey. These concentrations refer to the actual concentrations after diluting the test preparations with spore stimulant and spore suspension. A formulation containing 0.1 g. of the test compound, 4 ml. acetone, 2 ml. stock emulsifier solution (0.5% Triton X-155 in water by volume) and 74 ml. distilled water is used for this test. The concentration of

TABLE IV

| Product | Reactant | Mole Ratio KF/Reactant | Solvent | Reaction Conditions | | Physical Constants of Product | | Elemental Analysis | | | |
|---|---|---|---|---|---|---|---|---|---|---|---|
| | | | | Time, hrs. | Temp., °C. | B.P., °C. | M.P., °C. | Percent Calculated | | Percent Actual | |
| | | | | | | | | C | H | C | H |
| Fluoroterephthalonitrile | Chloroterephthalonitrile | 1.5 | DMSO₂* | 4 | 120-210 | 121-123.5 | | 65.8 | 2.1 | 66.0 | 2.0 |
| 2,5-difluoroterephthalonitrile | 2,5-dichloroterephthalonitrile | 3 | DMSO₂ | 4 | 140-200 | | 155-158 | 58.5 | 1.2 | 58.9 | 1.2 |
| Dichlorodifluoroterephthalonitrile | Tetrachloroterephthalonitrile | 3 | DMF** | 3 | 110-115 | 278-279 | 134-135.5 | 41.2 | 0.0 | 41.5 | 0.2 |
| Chlorotrifluoroterephthalonitrile | ---do--- | 3 | DMF | 3 | 110-115 | 252-253 | 126.5-128 | 44.4 | 0.0 | 44.0 | 0.4 |
| 5-chloro-2,4,6-trifluoroisophthalonitrile | Tetrachloroisophthalonitrile | 6 | DMF | 4 | 100 | | 109-110 | 44.3 | 0.0 | 44.7 | 0.2 |
| 2-chloro-6-fluorobenzonitrile | 2,6-dichlorobenzonitrile | 2 | DMSO₂ | 4 | 150-210 | 104/11 mm | | 53.8 | 1.9 | 53.3 | 1.8 |
| 2,6-difluorobenzonitrile | ---do--- | 3 | DMSO₂ | 22 | 160 | 82-82.5/12.5 mm | | 60.4 | 2.2 | 60.7 | 2.4 |
| 3,5-dichloro-2,6-difluorobenzonitrile | 2,3,5,6-tetrachlorobenzonitrile | 5 | DMSO₂ | 1½ | 120-185 | 225-226 | 52-54 | 40.3 | 0.5 | 40.4 | 0.6 |

* Dimethyl sulfone.
  ** Dimethyl formamide.

EXAMPLE 7

*Inhibition of sclerotial germination*

This test is used to measure the ability of compounds of this invention to inhibit the germination of sclerotia of *Sclerotium rolfsii*.

Sterilized soil is infested with *Sclerotium rolfsii* and subsamples placed into a series of 4-oz. Dixie cups. An appropriate amount of the test formulation is drenched onto the soil at a dosage of 64 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 parts per million. Lower concentrations of toxicant are obtained by diluting the formulation with distilled water. The surface area of the soil in the cups is 5.73 sq. in.; therefore, a rate of 1 pound per acre requires 0.414 mg. of chemical per cup. After drenching, the Dixie cups are then incubated for several days at 70° F. in a controlled temperature cabinet. The test chemicals are rated for their ability to inhibit mycelial growth of the organism on the surface of the soil. Untreated checks and a standard material are included in each test in addition to a check planted in sterilized soil. Using this procedure, the following results are obtained:

toxicant in this formulation is 1250 parts per million. The concentrations given above are diluted from this original formulation. Germination records are taken after 20 hours of incubation at 22° C. by observing several microscope fields so that at least 100 spores of each fungus have been examined at each concentration. Test compounds are given alphabetical ratings which correspond to the concentration that inhibits germination of half the spores (ED50) in the test drops: $AAA=0.01$ to 0.1 p.p.m.; $AA=0.1$ to 1.0 p.p.m.; $A=1.0$ to 10 p.p.m.; $B=10$ to 100 p.p.m.; $C=100$ to 1000 p.p.m.; and $D=1000$ p.p.m. Using this procedure, the following results were obtained:

Compound tested: Rating
  Chlorotrifluoroterephthalonitrile _____ AA
  Dichlorodifluoroterephthalontrile _____ AA
  Tetrachloroisophthalonitrile _____ AA
  5-chloro-2,4,6-trifluoroisophthalonitrile _____ AA

EXAMPLE 9

*Foliage protectant fungicide test*

The tomato foliage disease test measures the ability of the test compound to protect tomato foliage against infection by the early blight fungus *Alternaria solani* (Ell. and Mart.) Jones and Grout and the late blight fungus

*Phytophthora infestans* (Mont.) deBary. The method used is a modification of that described by McCallan and Wellman and employs tomato plants (var. Bonny Best) 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing 0.2 g. of test compound, 8 ml. acetone, 4 ml. stock emulsifier solution (0.5% Triton X–155 in water by volume) and 187.6 ml. distilled water is applied at dosages equivalent to 1000 and 200 p.p.m. of the test chemical. Lower concentrations of toxicant are obtained by dilution, maintaining the same concentration of acetone and emulsifier.

After the spray deposit is dry treated plants and controls (sprayed with formulation without toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight, to permit spore germination and infection before removal to the greenhouse.

After two days from the start of the test for early blight and three days for late blight, lesion counts are made on the three uppermost fully expanded leaves. The data are converted to percentage disease control based on the number of lesions obtained on the control plants. Dosages and percent disease control are given in the following table.

| Compound | Dosage, p.p.m. | Percent Control | |
|---|---|---|---|
| | | E.B. | L.B. |
| Tetrachloroisophthalonitrile | 60 | 100 | 100 |
| | 40 | 98 | 99 |
| | 30 | 92 | 99 |
| | 20 | 72 | 94 |
| | 10 | 0 | 70 |
| | 5 | 0 | 8 |
| 5-chloro-2,4,6-trifluoroterephthalonitrile | 1,000 | 82 | 98 |
| | 256 | 37 | 46 |

EXAMPLE 10

Seed decay and damping-off pea test

Soil known to be infested with seed decay and damping-off fungi is placed in plastic pots, 3¾-inches square at top, 2¹¹/₁₆-inches square at base, 3¼-inches high and treatment is accomplished by drenching the soil with the appropriate amount of a basic formulation containing 0.4 gram of the test compound, 8 ml. acetone, 4 ml. stock emulsifier solution (0.5% Triton X–155 by volume) and 187.6 ml. distilled water. Employing the plastic pots, 0.79 mg. of the chemical corresponds to 1 pound per acre. One day after treatment, soil is removed from each pot and thoroughly mixed in a five-pound paper bag and then replaced in the pot. Three days after drenching, 25 pea seeds, var. Perfection, are planted in each pot. From the time of treatment until the pea seeds begin to emerge, the pots are held at 20° C. in a controlled temperature cabinet. Untreated checks and a standard material are included in each test in addition to a check planted in sterilized soil. After seed emergence, the pot is removed to the greenhouse bench and percentage stand is recorded 14 days after planting. A stand of 100 percent and 28 percent is observed after 14 days at dosages of 32 and 16 pounds per acre, respectively, of tetrafluoroterephthalonitrile.

EXAMPLE 11

Seed decay and damping-off pea test

The test is used to determine activity against seed decay and damping-off fungi, primarily Pythium sp. and *Rhizoctonia solani*.

Soil known to be infested with seed decay and damping-off fungi is placed in 4″ x 4″ x 3″ plant band boxes and treatment is accomplished by drenching the soil with 37.2 ml. of the test formulation, which is equivalent to 64 pounds per acre. This test formulation contains 0.4 g. of test compound, 8 ml. acetone, 4 ml. stock emulsifier solution (0.5% Triton X–155 in water by volume) and 187.6 ml. distilled water. The concentration of toxicant in this formulation is 2000 parts per million. Lower concentrations of toxicant are obtained by diluting the formulation with distilled water. The plant band boxes have a surface area of 16 square inches and 1.16 mg. equals 1 pound per acre. One day after treatment, soil is removed from each box and thoroughly mixed in a five-pound paper bag and then replaced in the box. Three days after drenching, 25 pea seeds, var. Perfection, are planted in each box. From the time of treatment until the pea seeds begin to emerge, the boxes are held at 20° C. in a controlled temperature cabinet. Untreated checks and a standard material are included in each test in addition to a check planted in sterilized soil. After seed emergence, the box is removed to the greenhouse bench and percentage stand is recorded 14 days after planting. The percentage stand is then expressed as percent control. Using this procedure, the following results are obtained:

| Compound | Concentration, lbs./acre | Percent Control |
|---|---|---|
| Tetrachloroterephthalonitrile | 64 | 12 |
| Tetrachloroterephthalamide | 64 | 12 |

EXAMPLE 12

Soil mycelial growth inhibition test

This test is used to determine activity against seed decay and damping-off fungi, primarily Pythium and Rhizoctonia species.

Sterilized soil is infested with Pythium and Rhizoctonia and subsamples placed into a series of 4-oz. Dixie cups. An appropriate amount of the test formulation is drenched onto the soil at a dosage of 64 pounds per acre. This test formulation contains 0.4 g. of test compounds, 8 ml. acetone, 4 ml. stock emulsifier solution (0.5% Triton X–155 in water by volume) and 187.6 ml. distilled water. The concentration of toxicant in this formulation is 2000 parts per million. Lower concentrations of toxicant are obtained by diluting the formulation with distilled water. The surface area of the soil in the cups is 5.73 sq. in.; therefore, a rate of 1 pound per acre requires 0.414 mg. of chemical per cup. After drenching, the Dixie cups are then incubated for several days at 70° F. in a controlled temperature cabinet. The best chemicals are rated for their ability to inhibit mycelial growth of the organism on the surface of the soil. Untreated checks and a standard material are included in each test in addition to a check planted in sterilized soil. Using this procedure, the following results are obtained:

| Compound | Concentration, lbs./acre | Percent Control |
|---|---|---|
| Chlorotrifluoroterephthalonitrile | 64 | 100 |
| Dichlorodifluoroterephthalonitrile | 64 | 100 |
| 5-chloro-2,4,6-trifluoroisophthalonitrile | 64 | 100 |
| 2-chloro-6-fluorobenzonitrile | 64 | 95 |

EXAMPLE 13

Bean rust systemic

Pinto bean plants, at a growth stage when the trifoliate leaves are just beginning to emerge from the axial of the seed leaves, are used as the test species. These plants are grown in 4-inch pots and thinned to three plants per pot.

Usually the plants are about 10 to 14 days old from time of planting. There are, therefore, six primary seed leaves per pot for each test unit. In the test, an appropriate amount of the test formulation is drenched on each pot. This test formulation contains 0.4 g. of test compound, 8 ml. acetone, 4 ml. stock emulsifier solution (0.5% Triton V-155 in water by volume) and 187.6 ml. distilled water. The concentration of toxicant in this formulation is 2000 parts per million. A dosage of 56 ml. of the test formulation is equivalent to 112 mg. of chemical or 128 pounds per acre. Lower concentrations of toxicant are obtained by diluting the formulation with distilled water. About two or three hours after treatment the plants are exposed to a spore suspension of bean rust from a culture maintained in the greenhouse. After exposure, the plants are immediately placed in a moist chamber in a saturated atmosphere at 60° F., for 24 hours after which they are removed to the greenhouse. Counts are made about 10 days after spore exposure and the mean number of rust pustules per leaf is determined. These counts are calculated against the check counts to arrive at the percentage disease control. Using this procedure, the following results are obtained:

| Compound | Dosage, lbs. | Percent Disease Control |
| --- | --- | --- |
| 5-chloro-2,4,6-trifluoroisophthalonitrile | 64 | 92; St5, Ch. |

St=stunting (1 slight to 9 severe). Ch=chlorosis.

EXAMPLE 14

Soil mycelial growth inhibition test

The following test measures the ability of compounds of this invention in inhibit mycelial growth in soil. Sterilized soil is infested with *Rhizoctonia solani* (grown on a corn meal sand medium) by mixing two 250-ml. flasks of a ten-day-old culture of the organism per level flat of sterile soil. The infested soil is then placed in small Dixie cups (4-oz. squat). Treatment of the soil is accomplished by drenching the appropriate amount of a diluted formulation containing 0.4 g. of test compound, 8 ml. acetone, 4 ml. stock emulsifier solution (0.5% Triton X-155 in water by volume) and 187.6 ml. distilled water on the surface of the soil in the test cup. The concentration of toxicant in this formulation is 2000 parts per million. Lower concentrations of toxicant are obtained by diluting the formulation with distilled water. Surface area of the soil in the cups is 5.73 square inches; therefore, a rate of one pound per acre requires 0.414 mg. of chemical per cup. After drenching, the cups are placed in a saturated atmosphere at 70° F. for 48 hours. By this time the fungus mycelium has completely overgrown the surface of the soil in the control cups. Inhibition of mycelial growth in the treated cups is estimated on a scale from zero, complete inhibition of growth, to ten which is equivalent to controls. These grades are expressed as percent control. Using this procedure, the following results are obtained:

| Compound | Concentration, lbs./acre | Percent Control |
| --- | --- | --- |
| Tetrafluoroterephthalonitrile | 64 | 100 |
| Chlorotrifluoroterephthalonitrile | 64 | 100 |
| Dichlorodifluoroterephthalonitrile | 64 | 100 |
| Tetrachloroisophthalonitrile | 64 | 90 |
| 5-chloro-2,4,6-trifluoroisophthalonitrile | 64 | 90 |

EXAMPLE 15

Tests against 4 species of bacteria

Test formulations are examined for ability to inhibit the growth of four bacterial species *Erwinia amylovora* (*E.a.*), *Xanthomonas phaseoli* (*X.p.*), *Micrococcus pyrogenes* var. *aureus* (*M.a.*) and *Escherechia coli* (*E.c.*) at various concentrations. The basic test formulation contains 0.1 g. of the test chemical, 4 ml. acetone, 2 ml. stock emulsifier solution (0.5% Triton X-155 in water by volume) and 74 ml. distilled water, the concentration of toxicant in this formulation being 1250 parts per million. Lower concentrations of toxicant are obtained by diluting the basic formulation with distilled water. All of the bacterial species are cultured on nutrient agar slants except *X. phaseoli* which is grown on potato dextrose agar.

The cultures used for testing are subcultured for two sequential 24-hour periods to insure uniform test populations. Bacterial suspensions are made from the second sub-culture in the culture tube addition of distilled water and gentle agitation, after which they are filtered through double layers of cheesecloth and adjusted to standard concentrations by turbidimetric measurement. Each of four test tubes arranged in a rack receive one ml. of the 1250 p.p.m. test formulation. After the test formulations have been measured into a test tube, 3½ ml. of distilled water and ½ ml. of bacterial suspension for each respective test organism is added to each test tube. The medication tubes are then set aside at room temperature for four hours. After this exposure period, transfers are made by means of a standard 4 mm. platinum loop to 7 ml. of sterile broth. The broth tubes are then incubated for 48 hours at 29° to 31° C., at which time bacterial growth is determined by turbidimetric measurement. A reading is recorded for each test tube after shaking. Three replicates of each organism serve as controls. Comparative growth calculations are made on the percent of the mean check reading. This value, subtracted from 100, gives percent control as compared to checks. Using this procedure, the following results are obtained:

| Compound | Concentration (p.p.m.) | Percent Control | | | |
| --- | --- | --- | --- | --- | --- |
| | | E.a. | X.p. | M.a. | E.c. |
| Tetrafluoroterephthalonitrile | 250 | 100 | 20 | 20 | 20 |
| Chlorotrifluoroterephthanonitrile | 250 | 100 | 100 | 100 | 12 |
| | 100 | 100 | 38 | 11 | 19 |
| Dichlorodifluoroterephthalonitrile | 250 | 100 | 100 | 10 | 0 |
| | 100 | 100 | 100 | 0 | 0 |
| 5-chloro-2,4,6-trifluoroisophthalonitrile | 250 | 100 | 100 | 100 | 100 |
| | 100 | 100 | 100 | 100 | 100 |

EXAMPLE 16

Post-emergence pan test

This test measures the post-emergent herbicidal activity of test chemicals when applied to the foliage of seedling plants as well as to the soil in which they are growing. Two mixtures of seed are planted in soil contained in metal half flats, which are 8″ x 12″ at the soil surface. One-half of each pan is planted with a mixture containing the broadleaf species, buckwheat, aster and turnip. The other half of the pan is seeded to a mixture of three grasses, millet, perennial ryegrass, and sorghum. One-half level teaspoon of each seed mixture is planted in each pan. The flats are then removed to the greenhouse and the test species are allowed to grow until one true leaf is present on the slowest growing broadleaf (aster), which requires 9 to 14 days. At this point the surface of the soil in the pans is uniformly covered by spraying, at 10 pounds per square inch air pressure, with 40 ml. of a test formulation containing the toxicant. Formulations containing 165.6 mg. and 82.8 mg. of the test chemical are equivalent to a coverage of 24 and 12 pounds per acre, respectively. Each test formulation contains the toxicant, equal volumes of water and acetone, and 2 drops of Triton X-155.

One and two weeks after treatment, estimates are made on the fresh weight of seedling stand in the test pans, as well as that in untreated control pans. The percent control obtained with the test chemical is calculated. Using this procedure, the following results are obtained:

records are taken. Phytotoxicity is rated on the scale from 0, indicating no plant injury, to 11, plant kill.

| Compound Tested | Concentration, lbs./acre | Percent Control | | | |
|---|---|---|---|---|---|
| | | Broadleaf weeds | | Grassy weeds | |
| | | 1 week | 2 weeks | 1 week | 2 weeks |
| Chlorotrifluoroterephthalonitrile | 24 | | 100 | | 100. |
| | 12 | 85 | 95 | 85 | 95. |
| | 6 | 80 | 90 | 80 | 90. |
| | 3 | 55 Ph1 | 60 Ph1 | 25 | 80 Fe. |
| Tetrafluoroterephthalonitrile | 12 | | 80 | | 50. |
| Dichlorodifluoroterephthalonitrile | 24 | | 95 | | 99. |
| | 12 | 95 | 100 | 95 Ph1 | 95.[1] |
| | 6 | 95 | 100 | 95 | 95. |
| | 3 | 90 Ph10 | 95 | 90 | 95. |
| 5-chloro-2,4,6-trifluoroisophthalonitrile | 24 | | 65 | | 85. |
| | 12 | 95 [2] | 95 [3] | 70 Ph1 | 90. |
| | 6 | 90 Ph2 | 90 Ph2 | 85 | 80 Ph2. |
| | 3 | 40 Ph1 | 20 Ph1 | 10 Ph1 | 10 Ph2. |
| 2-chloro-6-fluorobenzonitrile | 24 | | 30 Sb, Ch, St2 | | 80 Ph2, Fe, Ch. |

[1] No sorghum.
[2] Buckwheat left.
[3] No turnip.
Ph=Phytotoxicity rating, 0 for no injury to 11 for killing the plants.
Fe=Formative effects to the plants.
Sb=Stem bending.
Ch=Chlorosis.
St=Stunting (1 slight to 9 severe).

EXAMPLE 17

*Soil-watering tests—Tomato and bean*

To measure the growth regulating and herbicidal responses when chemicals are absorbed by roots and translocated, tomato plants, var. Bonny Best, 5 to 7 inches tall, and beans, var. Tendergreen, just as the trifoliate leaves are beginning to unfold, are treated by drenching appropriate portions of a formulation containing 0.4 g. of the test chemical, 8 ml. acetone, 4 ml. stock emulsifier solution (0.5% Triton X–155 in water) and 187.6 ml. distilled water (concentration of the test chemical=2000 p.p.m.) on soil in clay pots containing the test plants. Tomatoes (1 plant per 4-inch pot) and bean plants (4 plants per 3½-inch pot) are treated with appropriate dosages of the 2000 p.p.m. formulation. Dosages of 56 ml. of the formulation in the 4-inch pot and 42 ml. in the 3½-inch pot are equivalent to 112 mg. and 84 mg. of chemical per pot, respectively, or 128 pounds per acre. Plants are held in a greenhouse for two weeks before records are taken. Phytotoxicity is rated on the scale from 0, indicating no plant injury, to 11, plant kill. Additionally, all other responses such as stunting, formative effects, defoliant activity, growth regulant properties, chlorosis and the like are recorded. Using this procedure, the following results are obtained:

| Compound | Concentration, lbs./acre | Phytotoxicity Rating | |
|---|---|---|---|
| | | Tomato | Beans |
| Chlorotrifluoroterephthalonitrile | 64 | 11 | 11. |
| | 32 | 6 Sc, Ch, St8 | 5 Sc, St2. |
| | 16 | 1 Ch, St5 | 0 Fe, St1. |
| | 8 | 0 Ch | 0 Fe, St1. |
| Dichlorodifluoroterephthalonitrile | 64 | 11 St9, Sc | 0. |
| 5-chloro-2,4,6-trifluoroisophthalonitrile | 64 | 11 St3, Fe | 2. |
| | 32 | 2 St9, Ch | 0 St9. |
| | 16 | 0 | 0. |
| 2-chloro-6-fluorobenzonitrile | 64 | 11 | 11. |
| | 32 | 10 St9, Sc | 10. |
| | 16 | 10 St9, Sc | 10. |
| | 8 | 0 St9 | 2 St5, Fe. |
| | 4 | 1 St5, Ep | 0 St5, Fe. |
| | 2 | 0 | 0. |
| | 1 | 0 | 0. |
| 2,6-difluorobenzonitrile | 64 | 11 | 11. |
| | 32 | 8 St9, Ep | 7 St8, Ch.[1] |
| | 16 | 6 St9, Ch [1] | 6 St6, Ch.[1] |
| | 8 | 5 St5, Ch [1] | 3 St1, Ch.[1] |
| | 4 | 2 Ch [1] | 1 Ch.[1] |
| | 2 | 2 Ch [1] | 1 Ch.[1] |
| | 1 | 0 Ch | 1 Ch. |

[1]=Necrosis.
Sc=Stem collapse.
Ch=Chlorosis.
St=Stunting (1 slight to 9 severe).
Fe=Formative effects to the plants.
Ep=Epinasty.

EXAMPLE 18

*Pre-emergence tests in soil*

To evaluate the effect of compounds of this invention upon the germination and subsequent growth of seeds in soil, two mixtures of seeds are used. One contains three broadleaf species (turnip, flax and alfalfa) and the other contains three grass species (millet, ryegrass and timothy). Each mixture is planted diagonally in one-half of a 9″ x 9″ x 2″ aluminum pan filled to within one-half inch of the top with composted greenhouse soil. After planting, the seed mixture is uniformly covered with about one-quarter inch soil and watered. After 24 hours, a quantity of a basic formulation containing 167 mg. of the test chemical, 20 ml. acetone, 2 drops Triton X-155, and 20 ml. of distilled water is sprayed, at 10 pounds per square inch air presure, uniformly over the surface of the pan. A dosage of 40 ml. of the basic formulation is equivalent to 32 pounds active chemical per acre. When less concentrated dosages are desired, the basic formulation is diluted. Two weeks after treatment, estimates are made on the fresh weight of seedling stand in the treated pans as well as in an untreated control pan. The percent control obtained with the test chemical is calculated. Using this procedure, the following results are obtained:

| Compound | Concentration, lbs./acre | Percent Control | |
|---|---|---|---|
| | | Broad-leaf weeds | Grassy weeds |
| Tetrafluoroterephthalonitrile | 24 | 90 | 25 |

EXAMPLE 19

Pre-emergence tests in soil

To evaluate the effect of compounds of this invention upon the germination and subsequent growth of seeds in soil, two mixtures of seeds are used. One contains three broadleaf species (buckwheat, aster and turnip) and the other contains three grass species (millet, perennial ryegrass and sorghum). Each mixture is planted diagonally in one-half of a 9" x 9" x 2" aluminum pan filled to within one-half inch of the top with composted greenhouse soil. After planting, the seed mixture is uniformly covered with about one-quarter inch soil and watered. After 24 hours, a quantity of a basic formulation containing 125 mg. of the test chemical, 20 ml. acetone, 2 drops Triton X-155, and 20 ml. of distilled water is sprayed, at 10 pounds per square inch air pressure, uniformly over the surface of the pan. A dosage of 40 ml. of the basic formulation is equivalent to 24 pounds active chemical per acre. When less concentrated dosages are desired, the basic formulation is diluted. Two weeks after treatment, estimates are made on the fresh weight of seedling stand in the treated pans as well as in an untreated control pan. The percent control obtained with the test chemical is calculated. Using this procedure, the following results are obtained:

| Compound | Concentration, lbs./acre | Percent Control | |
|---|---|---|---|
| | | Broad-leaf weeds | Grassy weeds |
| Chlorotrifluoroterephthalonitrile | 24 | 60 | 0. |
| Dichlorodifluoroterephthalonitrile | 24 | 20 | 70 St2. |
| 2-chloro-6-fluorobenzonitrile | 24 | 100 | 100. |
| 2,6-difluorobenzonitrile | 24 | 70 | 0. |

St=Stunting (1 slight to 9 severe).

EXAMPLE 20

Root-knot nematodes

This test is an evaluation of the effectiveness of the compounds of this invention against root-knot nematodes (Meloidogyne sp.).

Composted greenhouse soil diluted by one-third with clean, washed sand is placed in ½-gallon glazed crocks and infested with 3 to 5 g. of knotted or galled tomato roots. Treatment is accomplished by mixing the test chemical intimately with the soil if a solid, or by drenching, if a liquid, paste, or of gummy consistency. The drench formulation contains 4% acetone, 0.01% Triton X-155, 0.384% test chemical in a total volume of 100 ml. of water, all of which is drenched on the test crock. Concentration of this formulation is 256 pounds per acre, based on the surface area of the ½-gallon test container. The soil surface area equals 21.7 square inches, therefore, 256 pounds per acre equals 384 mg. of chemical. Lower concentrations are prepared by employing less of the test chemical in the formulation. The mixing of the solid test chemicals is accomplished by placing the infested soil and the chemical in a 20-pound paper bag and mixing thoroughly. The soil is then replaced in the crock to which is added 100 ml. of water. In the case of the drench treatment, the chemicals are mixed after 2 or 3 days as described above via the paper bag method. After treatment, all crocks are stored at 20° C., being covered with plastic to maintain moisture.

Seven days after treatment, three seedling (var. Bonny Best) tomatoes are transplanted into each crock. After three weeks in the greenhouse, the plants are removed from the soil carefully and the roots inspected for nematode galls. A rating of infection is made from 0=no galls or complete control to 10=heavily galled roots comparable to controls. Phytotoxicity results are also reported (0=no effect to 11=plant dead). Each of the three plant root systems is rated separately and the average is multiplied by 10 and subtracted from 100 to give percent nematode control. Results of the test are as follows:

| Compound | Concentration, lbs./acre | Percent Control Root-Knot Nematodes |
|---|---|---|
| Tetrafluoroterephthalonitrile | 128 | 90. |
| Dichlorodifluoroterephthalonitrile | 64 | 90 Ph1. |
| | 128 | 100 Sc. |

Ph=Phytotoxicity rating, 0 for no injury to 11 for killing the plants.
Sc=Stem collapse.

EXAMPLE 21

Cucumber anthracnose

This test measures the ability of the test compound to control anthracnose of cucumber incited by the fungus *Colletotrichum lagenarium*.

The method used is a modification of that described by McCallan and Wellman and employs cucumber plants, (var. National Pickling) having one fully expanded leaf. Duplicate plants are sprayed with various dosages of the test formulation at 20 lbs./sq. in. air pressure while being rotated on a turntable in a hood. The center of the turntable is 45 inches from the nozzle of the spray gun. The test formulation containing 0.2 g. of test compound, 8 ml. acetone, 4 ml. stock emulsifier solution (0.5% Triton X-155 in water by volume) and 187.6 ml. distilled water is applied at dosages equivalent to 1000 and 200 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation without toxicant) are sprayed while being rotated on a turntable with a spore suspension containing approximately 400,000 spores per ml. of *Colletotrichum lagenarium*. The atomizer used delivers 20 ml. in the 30-second exposure period. The plants are held in a saturated atmosphere for 24 hours at 70° F. to permit spore germination and infection before removal to the greenhouse.

After four to six days from the start of the test lesion, counts are made. The data are converted to percentage disease control based on the number of lesions obtained on the control plants. Dosages and percent disease control are given in the following table:

| Compound | Dosage, p.p.m. | Percent Disease Control |
|---|---|---|
| Tetrachloroisophthalonitrile | 64 | 100 |
|  | 32 | 99 |
|  | 16 | 95 |
|  | 8 | 80 |
|  | 4 | 68 |

EXAMPLE 22

Control of apple scab

The apple scab disease test measures the ability of the test compound to protect apple seedlings against infection by the fungus *Venturia inaequalis*.

The method used is a modification of that described by McCallan and Wellman and employs McIntosh apple seedlings, 5 to 8 weeks old with 4 to 6 leaves. Duplicate seedlings are sprayed with various dosages of the test formulation at 40 lbs./sq. in. air pressure while being rotated on a turntable in a hood. The center of the turntable is 45 inches from the nozzle of the spray gun. The test formulation containing 0.2 g. of test compound, 8 ml. acetone, 4 ml. stock emulsifier solution (0.5% Triton X-155 in water by volume) and 187.6 ml. distilled water is applied at dosages equivalent to 1000 and 200 p.p.m. of the test chemical. Lower concentration of toxicant are obtained by employing less toxicant and more water, thereby maintaining the same concentration of acetone and emulsifier.

After the spray deposit is dry, treated seedlings and controls (sprayed with formulation without toxicant) are sprayed while being rotated on a turntable with a conidial suspension of the fungus. The atomizer used delivers 20 ml. in the 30-second exposure period. The seedlings are held in a saturated atmosphere for 48 hours at 60° F. to permit spore germination and infection before removal to the greenhouse. After 10 to 14 days from the start of the test lesion counts are made. The data are converted to percentage disease control based on the number of lesions obtained on the control plants. Dosages and percent disease control are given in the following table:

| Compound | Dosage, p.p.m. | Percent Disease Control |
|---|---|---|
| Tetrachloroisophthalonitrile | 1 | 100 |
|  | 0.5 | 100 |
|  | 0.25 | 100 |
|  | 0.125 | 50 |

EXAMPLE 23

Protection of peas from Pythium sp. by soil treatment (non-inoculated and inoculated soil)

Air-dry, sterile soil is infested with the organism Pythium sp. The soil is placed into 3¼" x 3¼" x 2½" plastic boxes. An appropriate amount of test formulation is poured onto the soil to give the desired rate of application, e.g. 25 ml. is equivalent to a dosage of 64 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is thoroughly incorporated into the soil. An identical box of soil is prepared which has been treated with the test formulation, but has not been inoculated with the organism. The non-inoculated treated control is used to determine the phytotoxicity of each test compound. Twenty-five Perfection peas are planted on the treated soil in each box. Each box receives 50 ml. of water and is placed in a humidity chamber maintained at 70° F. for two days. The boxes are then transferred to the greenhouse. Effectiveness of the test chemical is determined by the percentage of plants growing 14 days after treatment and planting.

| Compound Tested | Concentration, lbs./acre | Percent Stand | |
|---|---|---|---|
|  |  | Non-inoculated | Inoculated |
| Chlorotrifluoroterephthalonitrile | 64 | 48 St7 | 24 St6. |
|  | 32 | 100 | 32 St4, Do. |
|  | 16 | 96 | 20 St4, Do. |
| Dichlorodifluoroterephthalonitrile | 64 | 96 | 98. |
|  | 32 | 100 | 78 Do. |
|  | 16 | 96 | 78 Do. |

St=Stunting (1 slight to 9 severe).
Do=Damping-off.

EXAMPLE 24

Protection of cucumbers from Rhizoctonia solani by soil treatment (non-inoculated and inoculated soil)

Air-dry, sterile soil is infested with the organism *Rhizoctonia solani*. The soil is placed into 3¼" x 3¼" x 2½" plastic boxes. An appropriate amount of test formulation is poured onto the soil to give the desired rate of application, e.g., 25 ml. is equivalent to a dosage of 64 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 parts per million. The test formulation is thoroughly incorporated into the soil. An identical box of soil is prepared which has been treated with the test formulation, but has not been inoculated with the organism. The non-inoculated treated control is used to determine the phytotoxicity of each test compound. Twenty-five National Pickling cucumber seeds are planted in the treated soil in each box. Each box receives 50 ml. of water and is placed in a humidity chamber maintained at 70° F. for 2 days. The boxes are then transferred to the greenhouse. Effectiveness of the test chemical is determined by the percentage of plants growing 14 days after treatment and planting.

| Compound Tested | Concentration, lbs./acre | Percent Stand | |
|---|---|---|---|
| | | Non-inoculated | Inoculated |
| Chlorotrifluoroterephthalonitrile | 64 | 20 St7 | 76 St6. |
| | 32 | 76 St5 | 92. |
| | 16 | 80 | 80. |
| | 8 | 40 | 68. |
| | 4 | 92 | 64. |
| Dichlorodifluoroterephthalonitrile | 64 | 96 St4, Dm | 92 St4, Ch. |
| | 16 | | 42 St4. |
| | 8 | | 8 St6. |

St=Stunting (1 slight to 9 severe).
Ch=Chlorosis.
Dm=Delayed emergence.

EXAMPLE 25

Protection of Cabbage from Sclerotium rolfsii by soil treatment

Air-dry sterile soil is infested with the organism *Sclerotium rolfsii,* grown on a mixture of corn meal and sand. The desired inoculum level is achieved by adding an appropriate amount of the corn meal-sand culture to the soil. The soil is placed into 3¼″ x 3¼″ x 2½″ plastic boxes. An appropriate amount of test formulation is poured onto the soil to give the desired rate of application, e.g. 25 ml. is equivalent to a dosage of 64 pounds per acre. This test formulation contains 0.4 g. of test compound, 8 ml. acetone, 4 ml. stock emulsifier solution (0.5% Triton X-155 in water by volume) and 187.6 ml. distilled water. The concentration of toxicant in this formulation is 2000 parts per million. The test formulation is thoroughly incorporated into the soil. An identical box of soil is prepared which has been treated with the test formulation, but has not been inoculated with the organism. The non-inoculated treated control is used to determine the phytotoxicity of each test company. Twenty-five cabbage seeds (Golden Acres) are planted in the treated soil in each box. Each box receives 50 ml. of water and is placed in a humidity chamber maintained at 70° F. for 2 days. The boxes are then transferred to the greenhouse. Effectiveness of the test chemical is determined by the percentage of plants growing 14 days after treatment and planting.

What is claimed is:

1. A halogenated-aromatic nitrile of the structure

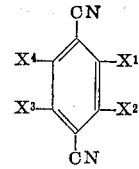

wherein $X^1$, $X^2$, $X^3$ and $X^4$ are each selected from the group consisting of hydrogen, chlorine, fluorine and bromine with at least one X being other than hydrogen.

2. A halogenated-aromatic nitrile of the structure

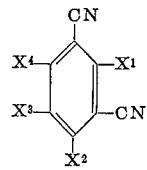

wherein $X^1$, $X^2$, $X^3$ and $X^4$ are each selected from the group consisting of hydrogen, chlorine, fluorine and bromine with at least one X being other than hydrogen and no more than three X's being fluorine.

3. Tetrachloroterephthalonitrile.
4. Tetrafluoroterephthalonitrile.
5. Chloroterephthalonitrile.
6. 2,3-dichloroterephthalonitrile.

| Compound Tested | Concentration, lbs./acre | Percent Stand | |
|---|---|---|---|
| | | Non-inoculated | Inoculated |
| Tetrafluoroterephthalonitrile | 8 | 100 | 68. |
| Chlorotrifluoroterephthalonitrile | 64 | 16 St7 | 32 St8. |
| | 32 | 92 St6, Fe | 00 St4. |
| | 16 | 72 | 86. |
| Dichlorodifluoroterephthalonitrile | 64 | 60 St8 | 72. |
| | 32 | 92 St4 | 76 St4. |
| | 16 | 100 | 76. |
| | 8 | 100 | 24. |
| Tetrachloroisophthalonitrile | 16 | 100 | 52. |
| 5-chloro-2,4,6-trifluoroisophthalonitrile | 32 | 92 | 68. |
| | 16 | | 36. |
| | 8 | | 10. |

St=Stunting (1 slight to 9 severe).
Fe=Formative effects to the plants.

It is to be understood that although the invention has been described with specific reference to particular embodiments thereof, it is not to be so limited, since changes and alterations therein may be made which are within the full intended scope of this invention as defined by the appended claims.

7. 2,5-dichloroterephthalonitrile.
8. Fluoroterephthalonitrile.
9. 2,5-difluoroterephthalonitrile.
10. Dichlorodifluoroterephthalonitrile.
11. Chlorotrifluoroterephthalonitrile.
12. Tetrachloroisophthalonitrile.

13. 5-chloro-2,4,6-trifluoroisophthalonitrile.
14. 4,6-dichloroisophthalonitrile.

References Cited by the Examiner

UNITED STATES PATENTS

| | | | |
|---|---|---|---|
| 2,174,568 | 10/1939 | Davies et al. | 260—465 |
| 2,648,621 | 8/1953 | Gerjovich et al. | 167—30 |
| 2,865,803 | 12/1958 | Lewis | 167—30 |
| 3,009,942 | 11/1961 | Klein et al. | 260—465 |
| 3,027,248 | 3/1962 | Koopman et al. | 72—2.3 |
| 3,080,225 | 3/1963 | Wilson et al. | 71—2.3 |
| 3,094,405 | 6/1963 | Toy et al. | 71—2.3 |
| 3,108,130 | 10/1963 | Haga et al. | 260—465 |

OTHER REFERENCES

Koopman Mededel: Landbounhoge School Opzoekingssta. Staat Gent, 196 vol. 27(3) pp. 1204–1213 (Chemical Abstracts, 1964, vol. 60, p. 15791e).

Pummer et al.: Journal of Research, National Bureau of Standards, 1959, vol. 63A, pp. 167–169.

Zhurnal Obscheii Khimmi: 1958, vol. 28, pp. 772.

Migrdichian Organic Synthesis: 1957, vol. I, pp. 421–422.

Conant: The Chemistry of Organic Compounds, 1939, p. 152.

Adams et al.: Organic Reactions, 1944, vol. II, pp. 50–51.

CHARLES B. PARKER, *Primary Examiner.*

D. R. MAHANAND, *Assistant Examiner.*

UNITED STATES PATENT OFFICE
CERTIFICATE OF CORRECTION

Patent No. 3,290,353                      December 6, 1966

Robert D. Battershell et al.

It is hereby certified that error appears in the above numbered patent requiring correction and that the said Letters Patent should read as corrected below.

Column 3, line 29, for "1" read -- 10 --; line 73, after "percent" insert -- by weight --; column 6, EXAMPLE 4, in the Table, column 2, under the heading "Percent Calculated" line 2 thereof, for "0.1" read -- 0.0 --; column 10, line 73, for "axial" read -- axil --; column 11, line 7, for "Triton V" read -- Triton X --; column 11, line 36, for "in" read -- to --; column 18, line 13, after "formulation" insert -- is 2000 parts by million. The test formulation --; line 19, for "on" read -- in --; column 19, line 41, for "company" read -- compound --.

Signed and sealed this 19th day of September 1967.

(SEAL)
Attest:

ERNEST W. SWIDER                          EDWARD J. BRENNER
Attesting Officer                       Commissioner of Patents